(12) United States Patent  
Cheng

(10) Patent No.: US 10,124,892 B2
(45) Date of Patent: Nov. 13, 2018

(54) METHOD AND CONTROL SYSTEM FOR CONTROLLING A FLYING OBJECT, AND AN UNMANNED AERIAL VEHICLE

(71) Applicant: Chaoyang University of Technology, Taichung (TW)

(72) Inventor: An-Chin Cheng, Taichung (TW)

(73) Assignee: Chaoyang University of Technology, Taichung (TW)

( * ) Notice: Subject to any disclaimer, the term of this patent is extended or adjusted under 35 U.S.C. 154(b) by 0 days.

(21) Appl. No.: 15/348,037

(22) Filed: Nov. 10, 2016

(65) Prior Publication Data

US 2017/0137127 A1 May 18, 2017

(30) Foreign Application Priority Data

Nov. 18, 2015 (TW) .............................. 104138131 A

(51) Int. Cl.
| | |
|---|---|
| *B64C 39/02* | (2006.01) |
| *G05D 1/10* | (2006.01) |
| *B64D 47/08* | (2006.01) |
| *G05D 1/00* | (2006.01) |
| *G06F 3/041* | (2006.01) |
| *G06F 3/044* | (2006.01) |

(52) U.S. Cl.
CPC ............ *B64C 39/024* (2013.01); *B64D 47/08* (2013.01); *G05D 1/0016* (2013.01); *G05D 1/101* (2013.01); *B64C 2201/027* (2013.01); *B64C 2201/12* (2013.01); *B64C 2201/14* (2013.01); *G06F 3/044* (2013.01); *G06F 3/0414* (2013.01)

(58) Field of Classification Search
CPC ..... B64C 39/024; G05D 1/0016; G05D 1/101
See application file for complete search history.

(56) References Cited

U.S. PATENT DOCUMENTS

| | | | |
|---|---|---|---|
| 8,761,964 B2* | 6/2014 | Lee ......................... | B64C 19/00 |
| | | | 244/189 |
| 9,459,620 B1* | 10/2016 | Schaffalitzky ....... | G05D 1/0016 |
| 2017/0235308 A1* | 8/2017 | Gordon ................ | G05D 1/0088 |
| | | | 701/2 |
| 2017/0351253 A1* | 12/2017 | Yang .................... | G05D 1/0016 |
| 2018/0111684 A1* | 4/2018 | Namgoong ........... | B64C 39/024 |

FOREIGN PATENT DOCUMENTS

KR 20180043983 A * 5/2018 ........... B64C 39/024

OTHER PUBLICATIONS

Cauchard et al., "Drone & Me: An Exploration into Natural Human-Drone Interaction", Proceedings of the 2015 ACM International Joint Conference on Pervasive and Ubiquitous Computing, Sep. 2015, pp. 361-365. (Year: 2015).*

* cited by examiner

*Primary Examiner* — Todd M Melton
(74) *Attorney, Agent, or Firm* — Trop Pruner & Hu, P.C.

(57) ABSTRACT

A method for controlling a flying object floating in the air includes the steps of: a) maintaining the flying object at a current position in the air; b) determining whether a first user input is received; c) in the affirmative, allowing the flying object to be moved arbitrarily without use of a remote controller and without returning to the current position; d) detecting position information of the flying object; e) determining whether a second user input different from the first user input is received; and f) in the affirmative, repeating steps a) to e) with the current position being updated according to the position information detected in step d).

17 Claims, 4 Drawing Sheets

METHOD AND CONTROL SYSTEM FOR CONTROLLING A FLYING OBJECT, AND AN UNMANNED AERIAL VEHICLE

CROSS-REFERENCE TO RELATED APPLICATION

This application claims priority to Taiwanese Patent Application No. 104138131 filed on Nov. 18, 2015.

FIELD

The disclosure relates to an unmanned aerial vehicle (UAV), more particularly to a method and control system for controlling a flying object, and a UAV.

BACKGROUND

A conventional unmanned aerial vehicle (UAV) requires utilization of a remote controller, a cell phone or a tablet computer to move to a desired position, and is usually positioned (maintained in the desired position) outdoors using Global Positioning System (GPS), and indoors using wireless fidelity (WiFi), Bluetooth, radio frequency identification (RFID) or infrared transmission technology.

SUMMARY

An object of the present disclosure is to provide a method and control system for controlling a flying object of an unmanned aerial vehicle (UAV) and a UAV.

According to one aspect of the present disclosure, a method for controlling a flying object of an unmanned aerial vehicle (UAV) floating in the air includes the steps of: a) maintaining the flying object at a current position in the air; b) determining whether a first user input is received; c) when the determination made in step b) is affirmative, allowing the flying object to be moved arbitrarily without use of a remote controller and without returning to the current position; d) detecting position information of the flying object; e) determining whether a second user input different from the first user input is received; and f) when the determination made in step e) is affirmative, repeating steps a) to e) with the current position being updated according to the position information detected in step d).

According to another aspect of this disclosure, a control system for controlling a flying object of a UAV is provided. The control system includes a driving unit, a position detecting unit, a user interface and a processor. The driving unit is configured to enable the flying object to float in the air. The position detecting unit is configured to detect position information of the flying object and to output a position signal indicative of the position information. The user interface is configured to generate a first control signal in response to a first user input and a second control signal in response to a second user input. The processor is electrically connected to the driving unit, the position detecting unit and the user interface. The processor is configured to, in response to receipt of the first control signal from the user interface, control the driving unit to allow the flying object to be moved arbitrarily in the air without use of a remote controller, and in response to receipt of the second control signal from the user interface, control the driving unit to maintain the flying object at a current position according to the position signal received from the position detecting unit.

According to still another aspect of this disclosure, an unmanned aerial vehicle (UAV) includes a flying object and a control system for controlling the flying object. The control system includes a driving unit, a position detecting unit, a user interface and a processor. The driving unit is configured to enable the flying object to float in the air. The position detecting unit is configured to detect position information of the flying object and to output a position signal indicative of the position information. The user interface is configured to generate a first control signal in response to a first user input and a second control signal in response to a second user input. The processor is electrically connected to the driving unit, the position detecting unit and the user interface. The processor is configured to, in response to receipt of the first control signal from the user interface, control the driving unit to allow the flying object to be moved arbitrarily in the air without use of a remote controller, and in response to receipt of the second control signal from the user interface, control the driving unit to maintain the flying object at a current position according to the position signal received from the position detecting unit.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
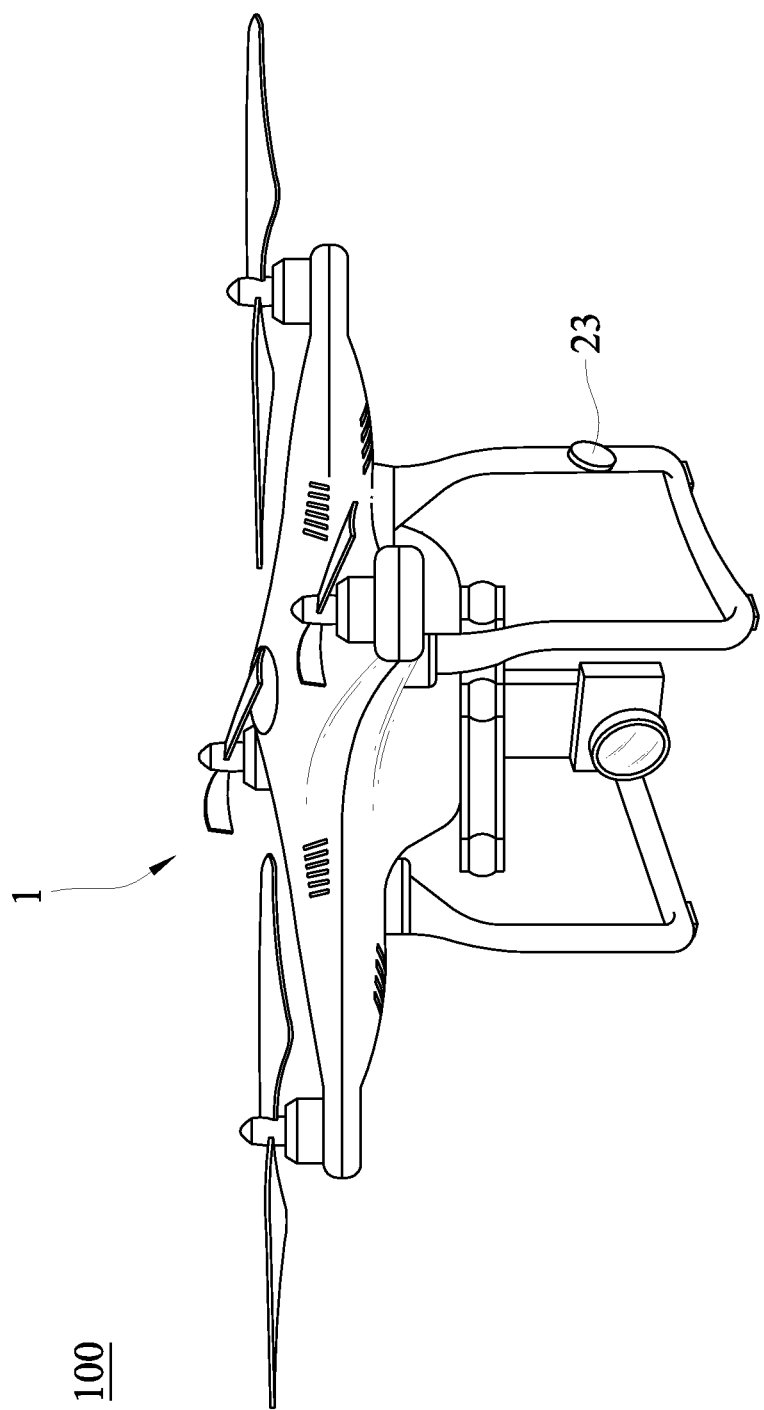
FIG. 1 is a schematic perspective view of an unmanned aerial vehicle (UAV) according to an embodiment of the present disclosure.
Figure 2:
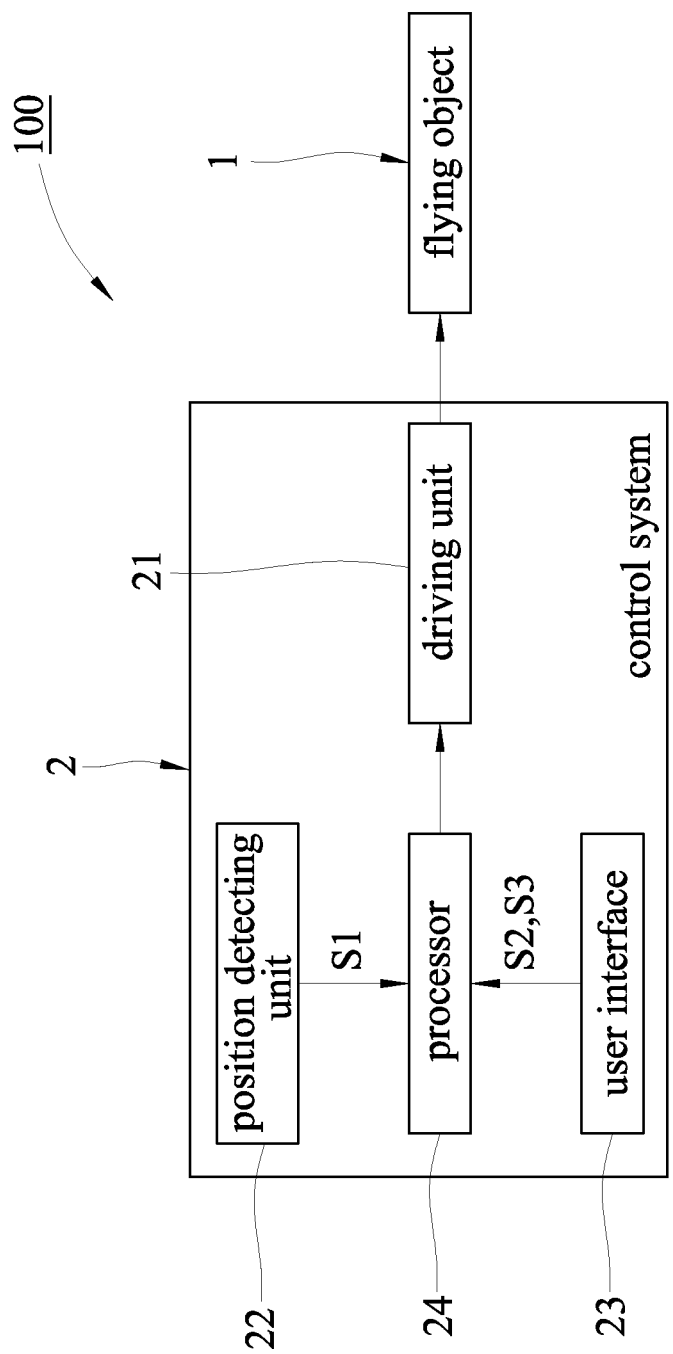
FIG. 2 is a block diagram of the UAV including a flying object and a control system according to an embodiment of the disclosure.

Referring to FIGS. 1 and 2, an unmanned aerial vehicle (UAV) 100 that includes a flying object 1 and a control system 2 according to an embodiment of this disclosure is shown. The flying object 1 is to be driven and controlled by the control system 2. The control system 2 is integrated with the flying object 1, and includes a driving unit 21, a position detecting unit 22, a user interface 23 and a processor 24. The driving unit 21 is configured to enable the flying object 1 to fly/float in the air. The driving unit 21 includes, for example, propellers mounted on the flying object 1, a motor for driving the propellers, and a digital electronic speed controller electrically connected to the motor for controlling revolutions per minute of the motor. The position detecting unit 22 is configured to detect position information of the flying object 1, and to output a position signal (S1) indicative of the position information. In this embodiment, the position detecting unit 22 is configured to detect a coordinate set of a position of the flying object 1 as the position information. In some embodiments, the position detecting unit 22 includes a global positioning system (GPS) device for detecting longitude and latitude coordinates, and an altitude detecting device, for example, a barometer for obtaining a relative height of the flying object 1 above ground level. In some embodiments, the position detecting unit 22 further includes a wireless communication device for indoor detection of the position information of the flying object 1 using wireless fidelity (WiFi) Bluetooth, radio frequency identification (RFID) infrared transmission technology, or the like.

The user interface 23 is configured to generate a first control signal (S3) in response to a first user input and a second control signal (S3) in response to a second user input different from the first user input. In this embodiment, the user interface 23 is disposed on an outer surface of the flying object 1 to detect a user touch as the first user input, and to detect cessation of the user touch as the second user input. The user interface 23 may be a capacitive switch or a pressure switch. In other embodiments, the user interface 23 may be a proximity sensor for detecting presence of a nearby object (e.g., a finger of the user or an object held by the user) as the first user input, and detecting absence of the nearby object as the second user input.

The processor 24 is electrically connected to the driving unit 21, the position detecting unit 22 and the user interface 23, and is configured to control the driving unit 21 in response to receipt of the first and second control signals (S2, S3) from the user interface 23.

Figure 3:
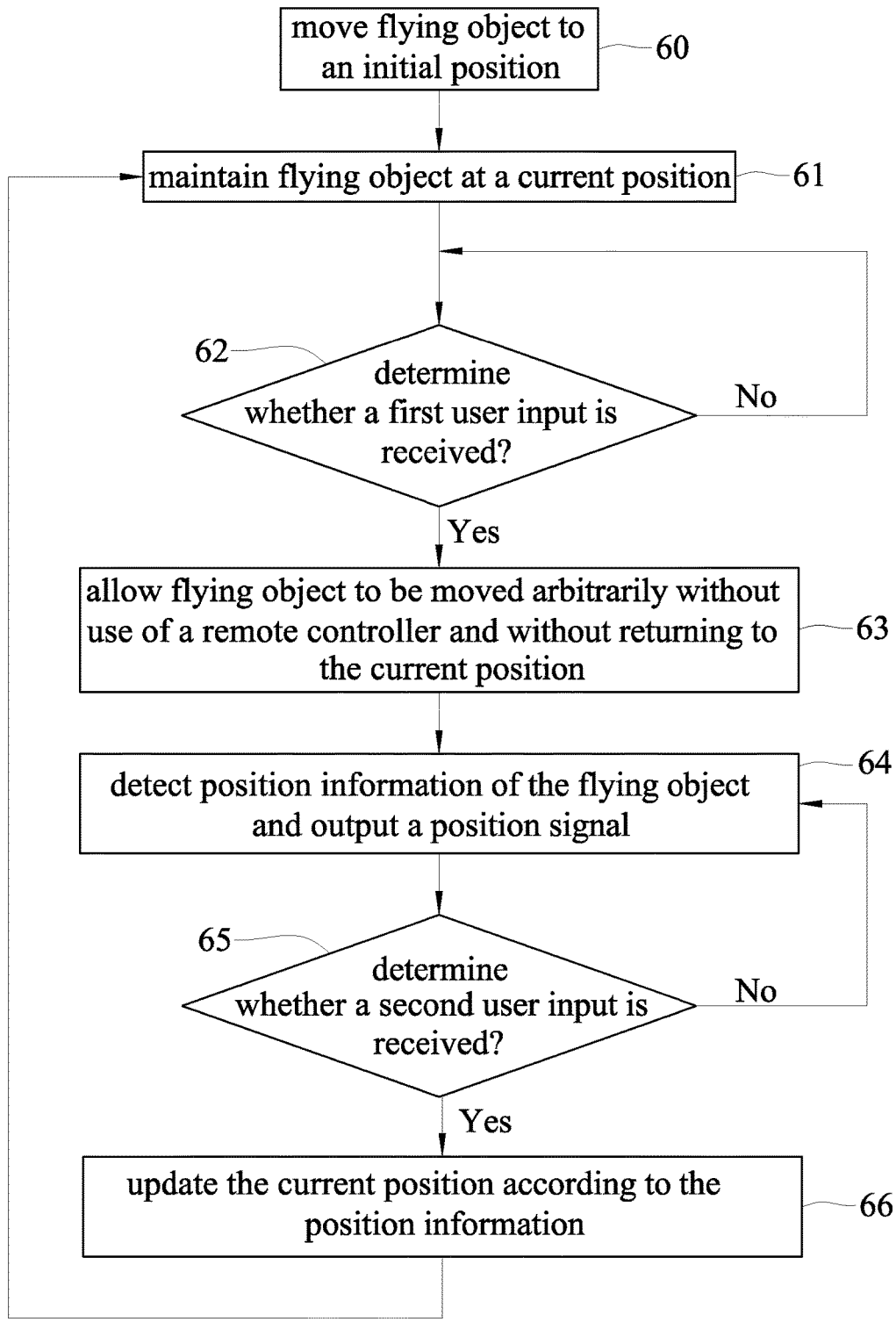
FIG. 3 is a flow chart of a method for controlling the flying object floating in the air according to an embodiment of the disclosure.

Further referring to FIG. 3, a method for controlling the flying object 1 is illustrated according to an embodiment of this disclosure. In step 60, the processor 24 enables the driving unit 21 to move the flying object 1 to an initial position. In this embodiment, the initial position may be a location at a predetermined height above ground level. For example, when the flying object 1 and the control system 2 are activated, the control system 2 drives the flying object 1 to fly upward by a predetermined distance (e.g., 1 meter) above ground level and to float thereat as the initial position. The initial position may be designated as desired in other embodiments of this disclosure.

In step 61, the processor 24 controls the driving unit 21 to maintain the flying object 1 at a current position (e.g., the initial position) in the air. That is to say, the flying object 1 would return to the current position after being moved by an external force such as wind.

In step 62, the processor 24 determines whether the first user input is received by determining whether the first control signal (S2), which is generated by the user interface 23 in response to, for example, the touch by the user, is received from the user interface 23. The flow goes to step 63 when the determination made in step 62 is affirmative, and goes back to step 62 when otherwise.

In step 63, the controller 24 allows the flying object 1 to be moved arbitrarily by the user without use of a remote controller and without returning to the current position. In particular, the user can move the flying object 1 to a desired position by, for example, physically and directly using the user's hand to push and move the flying object 1 around without operating a remote controller. Otherwise, when the determination made in step 62 is negative, the processor 24 repeats step 62 until it is determined that the first control signal (S2) is received.

In step 64, the position detecting unit 22 detects the position information of the flying object 1 and outputs to the processor 24 the position signal (S1) indicative of the position information. The position information includes the coordinate set of a position of the flying object 1 (i.e., the latitude and longitude coordinates of the flying object 1) and the relative height of the flying object 1 above ground level.

In step 65, the processor 24 determines whether the second user input is received by determining whether the second control signal (S3), which is generated by the user interface 23, for example, as the user interface 23 is released from being touched by the user, is received from the user interface 23. The flow goes to step 66 when the determination made in step 65 is affirmative, and goes back to step 63 when otherwise.

In step 66, the processor 24 updates the current position according to the position information detected in step 64, and then steps 61-65 are repeated with the updated current position. Namely, the processor 24 controls the driving unit 21 to maintain the flying object 1 at the updated current position where the user had moved the flying object 1 to in step 63 (i.e., the desired position).

Otherwise, when the determination made in step 65 is negative, steps 63-65 are repeated for continuously allowing the flying object 1 to be moved arbitrarily and for continuously detecting the position information of the flying object 1 until it is determined that the second control signal (S3) is received.

Figure 4:
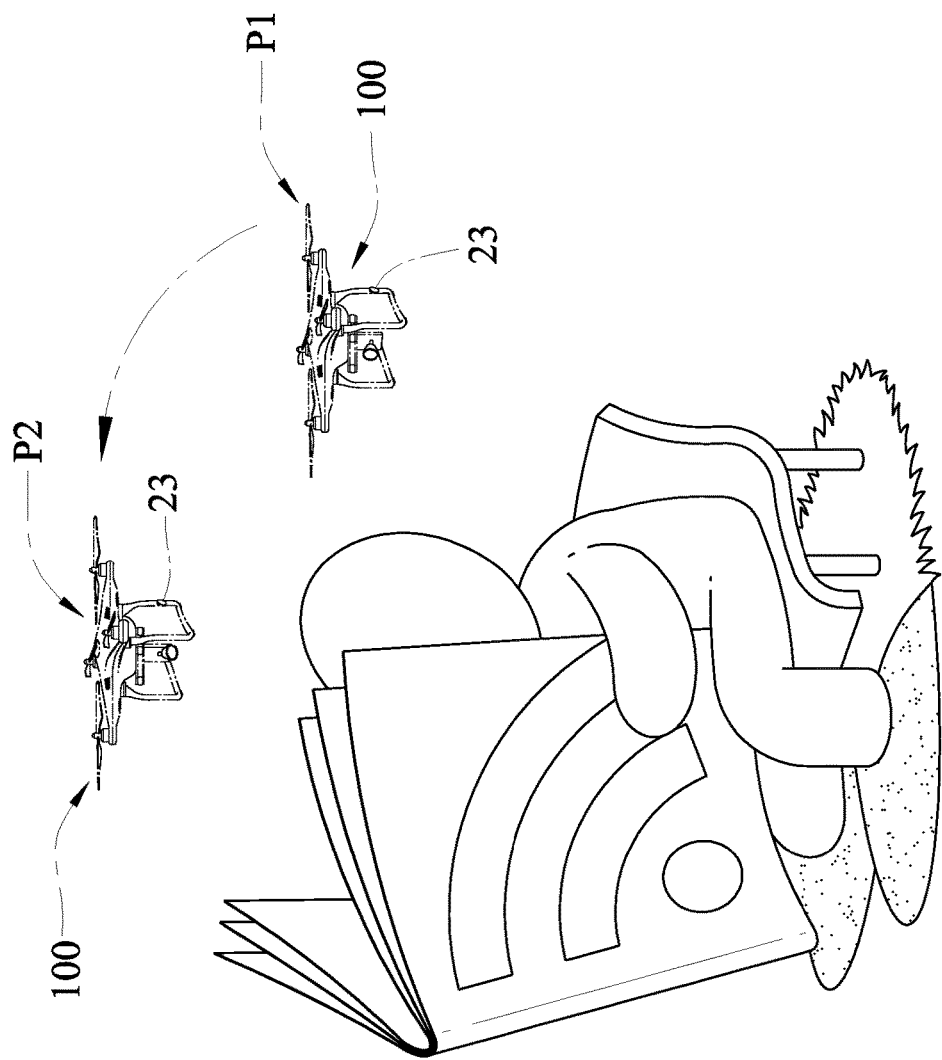
FIG. 4 is a schematic diagram illustrating an example of utilization of the UAV according to this disclosure.

FIG. 4 is a schematic diagram of an example of using the UAV 100 according to an embodiment of the disclosure as a lamp holder. In this example, the UAV 100 is maintained at a current position (P1) upper left of the user in the beginning. Further referring to FIG. 2, the user can simply touch the user interface 23 to thereby allow the UAV 100 to be moved arbitrarily to a desired position (P2), for example, upper right of the user without using a remote controller. At this time, the position detecting unit 22 detects the position information of the flying object 1. Once the UAV 100 is released by the user (i.e., the user no longer touches the user interface 23), the UAV 100 can be maintained at the desired position (P2). It can be appreciated that the disclosure can be implemented on a lamp holder, a working table, a selfie stand, a bookshelf, a holder for electronic devices, and so forth.

In view of above, the UAV 100 can be controlled without using a remote controller and is relatively simple for the user to operate.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling a flying object of an unmanned aerial vehicle (UAV) floating in the air, comprising steps of:
   a) maintaining the flying object at a current position in the air;
   b) determining whether the flying object is touched by a user;

c) when the determination made in step b) is affirmative, allowing the flying object to be moved arbitrarily without use of a remote controller and without returning to the current position;
d) detecting position information of the flying object;
e) determining whether the flying object is released from being touched by the user; and
f) when the determination made in step e) is affirmative, repeating steps a) to e) with the current position being updated according to the position information detected in step d).

2. The method of claim 1, further comprising, after step b), a step of repeating step b) until it is determined in step b) that the flying object is touched by a user.

3. The method of claim 1, further comprising, after step e), a step of repeating steps d) and e) until it is determined in step e) that the flying object is released from being touched by the user.

4. The method of claim 1, wherein the position information includes a coordinate set of a position of the flying object.

5. The method of claim 4, wherein the position information further includes a relative height of the flying object above ground level.

6. A control system for controlling a flying object of an unmanned aerial vehicle (UAV), said control system comprising:
a driving unit configured to enable the flying object to float in the air;
a position detecting unit configured to detect position information of the flying object and to output a position signal indicative of the position information;
a user interface configured to generate a first control signal in response to a first user input and a second control signal in response to a second user input different from the first user input, wherein said user interface is configured to detect a user touch as the first user input, and to detect cessation of the user touch as the second user input; and
a processor electrically connected to said driving unit, said position detecting unit and said user interface, and configured to
in response to receipt of the first control signal from said user interface, control said driving unit to allow the flying object to be moved arbitrarily in the air without use of a remote controller, and
in response to receipt of the second control signal from said user interface, control said driving unit to maintain the flying object at a current position according to the position signal received from said position detecting unit.

7. The control system as claimed in claim 6, wherein said user interface is one of a capacitive switch and a pressure switch.

8. The control system as claimed in claim 6, wherein said user interface is disposed on an outer surface of the flying object.

9. The control system as claimed in claim 6, wherein said position detecting unit is configured to detect a coordinate set of a position the flying object as the position information.

10. The control system as claimed in claim 9, wherein said position detecting unit is further configured to obtain a relative height of the flying object above ground level.

11. The control system as claimed in claim 6, wherein said position detecting unit includes a wireless communication device for indoors detection of the position information of the flying object using one of wireless fidelity (WiFi), Bluetooth, radio frequency identification (RFID) and infrared transmission technology.

12. An unmanned aerial vehicle (UAV), comprising:
a flying object; and
a control system for controlling said flying object, said control system including:
a driving unit configured to enable said flying object to float in the air;
a position detecting unit configured to detect position information of said flying object and to output a position signal indicative of the position information;
a user interface configured to generate a first control signal in response to a first user input and a second control signal in response to a second user input different from the first user input, wherein said user interface is configured to detect a user touch as the first user input, and to detect cessation of the user touch as the second user input; and
a processor electrically connected to said driving unit, said position detecting unit and said user interface, and configured to
in response to receipt of the first control signal from said user interface, control said driving unit to allow said flying object to be moved arbitrarily in the air without use of a remote controller, and
in response to receipt of the second control signal from said user interface, control said driving unit to maintain said flying object at a current position according to the position signal received from said position detecting unit.

13. The UAV as claimed in claim 12, wherein said user interface is one of a capacitive switch and a pressure switch.

14. The UAV as claimed in claim 12, wherein said user interface is disposed on an outer surface of said flying object.

15. The UAV as claimed in claim 12, wherein said position detecting unit is configured to detect a coordinate set of a position of said flying object as the position information.

16. The UAV as claimed in claim 15, wherein said position detecting unit is further configured to obtain a relative height of said flying object above ground level.

17. The UAV as claimed in claim 12, wherein said position detecting unit includes a wireless communication device for indoor detection of the position information of said flying object using one of wireless fidelity (WiFi), Bluetooth, radio frequency identification (RFID) and infrared transmission technology.

* * * * *